US011221846B2

(12) United States Patent
Kalia et al.

(10) Patent No.: US 11,221,846 B2
(45) Date of Patent: Jan. 11, 2022

(54) AUTOMATED TRANSFORMATION OF APPLICATIONS TO A TARGET COMPUTING ENVIRONMENT

(71) Applicant: International Business Machines Corporation, Armonk, NY (US)

(72) Inventors: Anup Kalia, Elmsford, NY (US); Jin Xiao, White Plains, NY (US); Jinho Hwang, Ossining, NY (US); Maja Vukovic, New York, NY (US); John Rofrano, Mahopac, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 51 days.

(21) Appl. No.: 16/823,649

(22) Filed: Mar. 19, 2020

(65) Prior Publication Data
US 2021/0294600 A1 Sep. 23, 2021

(51) Int. Cl.
*G06Q 30/00* (2012.01)
*G06F 7/00* (2006.01)
(Continued)

(52) U.S. Cl.
CPC ............... *G06F 8/76* (2013.01); *G06F 8/65* (2013.01); *G06F 8/71* (2013.01); *G06F 16/245* (2019.01); *G06N 3/0445* (2013.01); *G06N 3/08* (2013.01)

(58) Field of Classification Search
CPC .... G06F 9/44521; G06F 11/3688; G06F 8/71; G06F 8/60; G06F 8/65; G06F 8/61;
(Continued)

(56) References Cited

U.S. PATENT DOCUMENTS 7,672,957 B2 3/2010 Cotichini et al.
9,558,441 B2 1/2017 Bachelor et al.
(Continued)

FOREIGN PATENT DOCUMENTS

IN 201621008437 10/2017

OTHER PUBLICATIONS

Fafalios et al., Towards a Ranking Model for Semantic Layers over Digital Archives, 2 pages (Year: 2017).*
(Continued)

*Primary Examiner* — Thuy Dao
(74) *Attorney, Agent, or Firm* — Amin, Turocy & Watson, LLP

(57) ABSTRACT

A system can include a memory that stores computer-executable components and a processor, operably coupled to the memory, that can execute the computer-executable components stored in the memory. The computer-executable components can include a model generator component that can execute a search function on an application based on a set of application component topics to identify application components of the application that facilitate execution of the application. A configuration property extractor component can analyze the application based on the application components and can determine configuration properties associated with operating the application components. An application builder component can process the application components and the configuration properties and can generate instructions that facilitate execution of the application in a target computing environment.

17 Claims, 14 Drawing Sheets

(51) Int. Cl.

| | |
|---|---|
| *G10L 15/18* | (2013.01) |
| *G06F 16/2455* | (2019.01) |
| *G06F 16/248* | (2019.01) |
| *G06F 16/25* | (2019.01) |
| *G06F 8/76* | (2018.01) |
| *G06F 16/245* | (2019.01) |
| *G06F 8/65* | (2018.01) |
| *G06N 3/08* | (2006.01) |
| *G06F 8/71* | (2018.01) |
| *G06N 3/04* | (2006.01) |

(58) Field of Classification Search
CPC ..... G06F 8/63; G06F 8/75; G06F 8/20; G06F 8/70; G06F 8/30; G06F 11/3684; G06F 9/45558; G06F 16/907; G06F 16/951; G06F 16/78; G06F 16/76; G06F 16/245; G06F 21/6227; G06F 8/76; H04L 67/34; H04L 63/083

See application file for complete search history.

(56) References Cited

U.S. PATENT DOCUMENTS

| | | |
|---|---|---|
| 10,250,461 B2 | 4/2019 | Amendjian et al. |
| 2008/0021993 A1 | 1/2008 | Compton et al. |
| 2011/0185339 A1* | 7/2011 | Andrade ............ G06F 8/20 |
| | | 717/104 |
| 2014/0173574 A1* | 6/2014 | Schmidt ............ G06F 8/43 |
| | | 717/143 |
| 2015/0100942 A1* | 4/2015 | Misbhauddin ......... G06F 8/72 |
| | | 717/104 |
| 2016/0357520 A1* | 12/2016 | Soffer ............... G06F 8/34 |
| 2019/0212992 A1 | 7/2019 | Jonnadula et al. |
| 2020/0012892 A1* | 1/2020 | Goodsitt ............. G06F 9/547 |

OTHER PUBLICATIONS

Sabiri et al., "A Legacy Application Meta-model for Modernization," Proceedings of the 2nd International Conference on Big Data, Cloud and Applications, ACM, Mar. 29-30, 2017, 6 pages.

Hecht et al., "Codifying Hidden Dependencies in Legacy J2EE Applications," 25th Asia-Pacific Software Engineering Conference (APSEC), IEEE, 2018 10 pages.

Shatnawi et al., "Analyzing Program Dependencies in Java EE Applications," IEEE/ACM 14th International Conference on Mining Software Repositories (MSR), 2017, 11 pages.

Meng et al., "A Generic Framework for Application Configuration Discovery with Pluggable Knowledge," IEEE Sixth International Conference on Cloud Computing, 2013, 8 pages.

Lample et al. "Neural Architectures for Named Entity Recognition," https://www.aclweb.org/anthology/N16-1030/, Proceedings of NAACL-HLT, 2016, pp. 260-270, 11 pages.

Mell et al., "The NIST Definition of Cloud Computing," Recommendations of the National Institute of Standards and Technology, NIST Special Publication 800-145, Sep. 2011, 7 pages.

* cited by examiner

AUTOMATED TRANSFORMATION OF APPLICATIONS TO A TARGET COMPUTING ENVIRONMENT

BACKGROUND

The subject disclosure relates to applications and application operating environments, and more specifically automated transforming of applications from operations in a first computing environment to a target computing environment.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate transforming applications from a first computing environment to a target computing environment.

According to one or more embodiments, a system is provided. The system can include a memory that stores computer-executable components and a processor, operably coupled to the memory, that can execute the computer-executable components stored in the memory. The computer-executable components can include a model generator component that can execute a search function on an application based on a set of application component topics that identify application components of the application that facilitate execution of the application. A configuration property extractor component can analyze the application based on the application components and can determine configuration properties associated with operating the application components. An application builder component can process the application components and the configuration properties and can generate instructions that facilitate execution of the application in a target computing environment.

According to one or more other embodiments, a computer-implemented method can include receiving, by a system operatively coupled to a processor, a set of application component topics that specify resources of a target computing environment. The computer-implemented method can include searching an application, by the system, based on the application component topics to identify application components of the application that facilitate execution of the application. The computer-implemented method can include determining, by the system, configuration properties associated with operating the application components. The computer-implemented method can include generating, by the system, instructions that facilitate execution of the application in the target computing environment based on processing the application components and the configuration properties.

According to yet one or more other embodiments, a computer program product that facilitates migration of operations from a first computing environment to a target computing environment can be provided. The computer program product can include a computer readable memory having program instructions embodied therewith, where the program instructions can be executable by a processor that cause the processor to receive, by the processor, a set of application component topics that specify resources of a target computing environment. The instructions can search an application, by the processor, based on the application component topics to identify application components of the application that facilitate execution of the application. The instructions can determine, by the processor, configuration properties associated with operating the application components. The instructions can generate, by the processor, instructions that facilitate execution of the application in the target computing environment based on processing the application components and the configuration properties.

DETAILED DESCRIPTION

Figure 1:
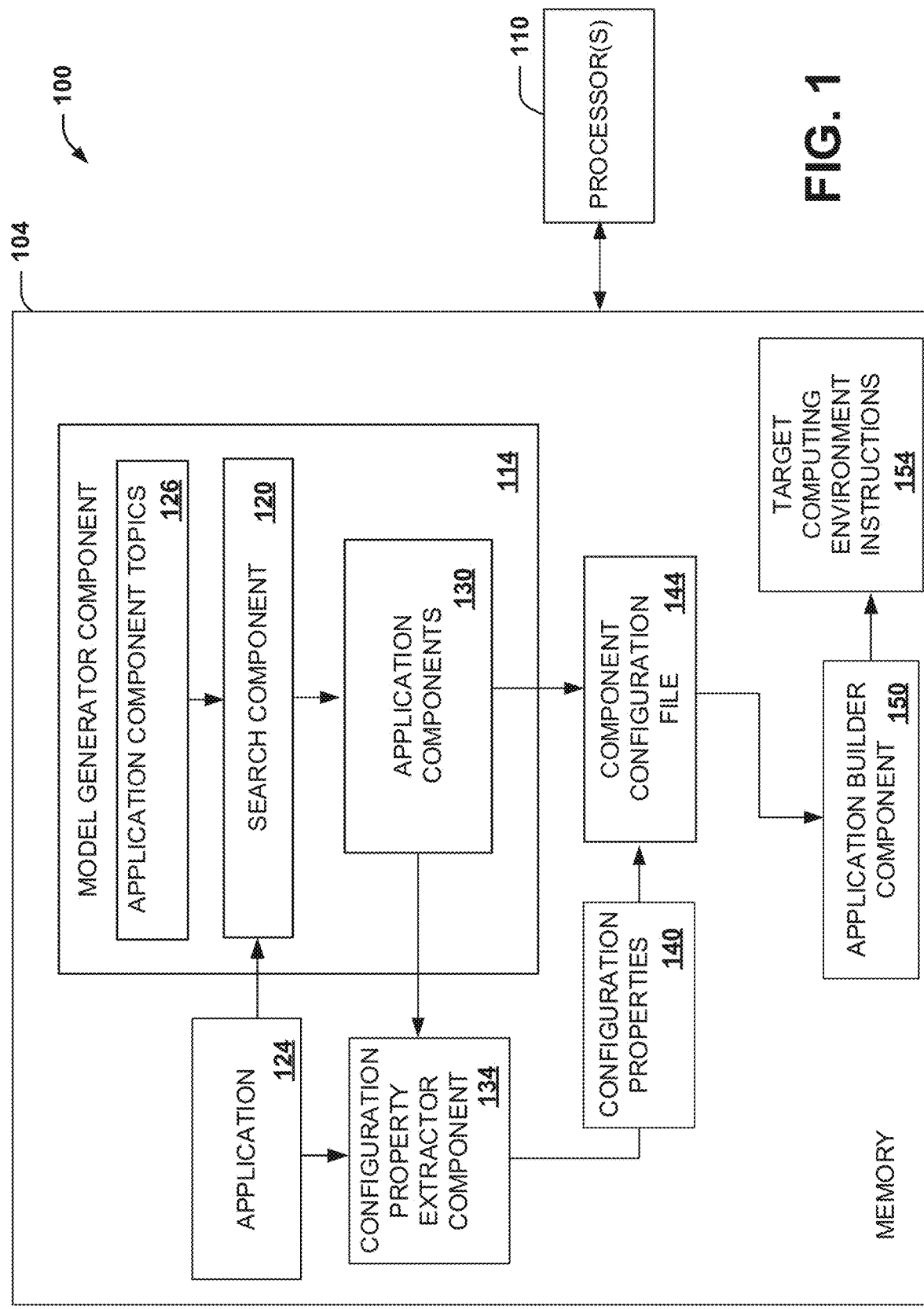
FIG. 1 illustrates block diagram of an example, non-limiting system that facilitates automated transformation of an application from a first computing environment to a target computing environment in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Modern computing applications are increasingly being migrated away from operating with local, internally-based architectures to distributed computing platforms such as cloud computing provides. Cloud computing can provide on-demand availability of computer system resources, including data storage, application server support, and operating system support and thus mitigates direct active management of such resources by system administrators. In some examples, cloud computing can describe data centers that are available to many users over the Internet. Large clouds, that are predominant today, can often have functions distributed over multiple locations from central servers and/or federated servers. Clouds may be limited to a single organization (e.g., enterprise clouds or private clouds), or made available to many organizations (e.g., public cloud). In some examples, hybrid clouds may exist that share resources between public and private entities. Thus, benefits of cloud computing include sharing of resources to achieve coherence between competing computing resources and facilitating economies of scale (e.g., each organization does not have to maintain separate resources).

With cloud computing gaining popularity for example, there is a desire to move older, legacy-based applications that may have been running and configured on outdated platforms to newer, target computing platforms such as provided by a cloud computing platform. This effort can be a daunting task however as a given legacy application must first be analyzed manually by a software engineer to determine the resources it needs to operate in a new environment. This can include manually determining the types of databases and application servers, for example, that presently operate with the legacy application and then attempting to manually determine the associated configurations for the respective resources used by the application. Moreover, after analyzing the needs of the legacy application in its present operating environment, target computing instructions need to be generated (e.g., manual coding) that allow the legacy application to begin to operate and use the resources of the newer platform (e.g., cloud computing platform). Unfortunately, there is no straight-forward or efficient process to not only understand the resource demands of the legacy application, but also to efficiently and timely migrate the legacy application from operating in its previous computing environment to its newer target computing environment. Thus, automated systems/methods for facilitating migration of resources supporting existing application deployments to resources supported by a target computing environment (e.g., cloud) are beneficial. Various embodiments described herein can address one or more of these issues.

Embodiments described herein can include automated systems, computer-implemented methods, and/or computer program products that facilitate transforming applications from a first computing environment to a target computing environment. To facilitate such transformation, a model generator component can be provided to automatically analyze an application for application components (e.g., resources such as databases and servers) used to operate with the application in the first computing environment. In an example embodiment, the model generator component can execute a search function on the application based on a set of application component topics that can be automatically learned from other application images operating in a target computing environment (e.g., cloud environment). Thus, the search function can retrieve application components of the application that facilitate execution of the application in the first computing environment.

Based on determining the application components by the model generator component, a configuration property extractor component can automatically analyze the application and can determine configuration properties associated with operating the application components in the first computing environment. The configuration properties can include, for example, database names, application server names, network settings, along with configuration parameters for the respective application components such as passwords and port numbers used for communications to the application. In response to determining the application components and the associated configuration properties of the application, an application builder component can process the application components and the configuration properties and can automatically generate instructions (e.g., output images executable on a cloud) that facilitate execution of the application in accordance with the resources of the target computing environment.

In an example embodiment, the model generator component can generate an instance level metamodel for the application based on the search function that describes the application components that facilitate execution of the application in the first computing environment. The instance level metamodel can be created as a file or data structure in memory that allows describing the application components (e.g., hierarchical structure) and dependencies (e.g., nodes of a database, network connections). An interface can be dynamically rendered by the model generator component that displays the application components retrieved by the search function. The interface can receive user feedback that enables updating the instance level metamodel with application components that may not have been retrieved by the search function.

The configuration property extractor component described herein can analyze related files of the application components and can employ machine learning that can learn from the related files of the application components. Parameters that define the configuration properties (e.g., names, passwords, network connections) can be extracted in response to the learning that enable configuration of the application components in the first computing environment. A component configuration file can store the respective application components and the associated configuration properties. For example, the model generator component can store the application components retrieved by the search function and the configuration property extractor component can store the configuration properties and associated parameters learned from analyzing the related files of the application components. Another dynamically generated feedback interface can be rendered by the model generator component and can display the configuration properties and associated parameters in the component configuration file. Such interface enables updating the component configuration file with configuration properties and/or associated parameters that may not have been determined by the configuration property extractor component.

In an example embodiment, the application builder component can store templates that describe target computing operations of the application components stored in the component configuration file. The application builder component can update the templates with the configuration properties and associated parameters for the respective application components in the component configuration file and can generate the target computing environment instructions based on the updates. For example, the application builder component can generate output images from the updated templates representing the target computing environment instructions. The output images can instruct a target computing system to execute the application and associated application components in a cloud computing environment, for example (e.g., from Docker images).

Based on generation of the output images, a reinforcement learning component can be provided that employs machine learning that learns from execution of the application and associated application components in the target computing environment. The reinforcement learning component can update the component configuration file based on the learning. Such learning facilitates discovery of uncovered, erroneous, or missing dependencies, for example, between application components and associated configuration properties or parameters in the target computing environment.

As mentioned above, the model generator component can apply application component topics in accordance with a search function to determine the application components operative with the application to be transformed to a new computing environment. In an example embodiment to determine the application component topics, a topic learning component can be provided that can employ machine learning that learns from words or phrases within input images (e.g., images that describe cloud computing execution/deployment). The input images can describe execution of a plurality of deployed target computing applications (e.g., images that describe cloud computing execution/deployment). The topic learning component can generate a target metamodel (e.g., file or data structure) that stores the set of application component topics based on the learning. The application component topics described herein can describe computing resources available to the application in the target computing environment. For example, the computing resources can include databases, operating systems, application servers, or other supporting applications. The topic learning component can include identifying the set of application component topics from the words or phrases within the respective input images. In an example embodiment, the input images can include instructions to execute the deployed applications in a cloud computing environment (e.g., Docker images). The search function described herein can, for example, be executed by a search engine that retrieves the application components from the application based on searching with words associated with the application component topics, where the search engine can be a crawler search engine or an elastic search engine in some examples.

By leveraging machine learning and automated searching, existing application resources and component configurations for a legacy application running in the first computing environment can be automatically determined. Output images can be automatically generated based on the determination which allows the application to be automatically migrated/transformed to a target computing environment (e.g., cloud). Thus, exemplary embodiments described herein can provide improved/efficient migration of existing applications to the target computing environment. This improvement described herein can be contrasted to existing deployment systems/methods that can require intensive costly and manual analysis to determine supporting resources of an application, determine the respective configurations for the resources, and provide manual coding of instructions to deploy the application in a target computing environment. Such embodiments described herein thus can constitute a concrete and tangible technical improvement over existing deployment systems and methods.

FIG. 1 illustrates an example, non-limiting system 100 that facilitates automated transformation of an application from a first computing environment to a target computing environment in accordance with one or more embodiments described herein. The system 100 can include a memory 104 that stores computer-executable components and a processor 110 (or processors), operably coupled to the memory, that can execute the computer-executable components stored in the memory. The computer-executable components can include a model generator component 114 that can include a search component 120 (e.g., search engine) that can execute a search function on an application 124 based on a set of application component topics. As used herein, the term "search function" refers to retrieving data associated with the application 124 based on words or phrases such as defined by the application component topics 126. As used herein, the term "application" refers to the overall components including application services that contribute to the execution and operation of a given task (or tasks) of a computing system.

As used herein, the term "application service" refers to a subset of functionality that contributes to the application 124. For instance, a mail server can be considered an application that exposes two or three services such as a send service (e.g., SMTP service) used to send email, and a read service to read e-mail (e.g., POP3 and an IMAP service) among other services of the mail server. Examples of application services can include services such as load balancing, application performance monitoring, application acceleration, autoscaling, micro-segmentation, service proxy and service discovery to deploy, run, and improve performance of applications. For a cloud-computing example, example application services can include load balancing, application firewalling, and service discovery among other services that can be provided for applications running in non-public, public, hybrid, and/or multi-cloud environments.

Other example services can include file storage services, backup services, and disaster recovery services. In some embodiments, example services can be any task or collection of tasks that perform computer-executable operations on a computerized platform. Example applications can include business applications including accounting and financial operations, engineering applications, design/development applications, inventory applications, and purchasing applications. In some embodiments, example applications can be any program or collection of programs that fulfill computer-executable functions of an entity within the framework of a computerized platform. Applications can be disbursed among a plurality of computing resources for a public and/or non-public entity operating in accordance with an open cloud environment and/or non-public network environment.

As used herein, the term "application component topics" refers to resources that can be employed to support and enable execution of the application 124 and associated application services in the target computing environment. The application component topics 126 can include words or phrases that indicate such resources that can include for example, target databases, target application servers, target operating systems, target supporting applications and/or target services. Automatic determination and generation of the application component topics 126 is described below with respect to FIGS. 2 and 4. Based on the application component topics 126, the search function of the search component 120 can identify application components 130 of the application 124 that facilitate execution of the application in a first computing environment (e.g., in a non-cloud environment). As used herein, the term "application components" includes resources that can support the application 124 in the first computing environment and can include for example, first database components, first application servers, or first operating systems. In other example embodiments, resources can be any component or service that supports operation of the application 124 in the first computing environment.

A configuration property extractor component 134 can analyze the application 124 based on the application components 130 and can determine configuration properties associated with operating the application components in the first computing environment. As used herein, the term "configuration properties" refer to attributes of a given application component 130 that describe interfaces (e.g., inputs and outputs) and connections to the component such that that application 124 can operate in a given computing environment. For example, example configuration properties of a database application component 130 may include a host name supporting the database, a database name for the database, a database username, a password, or a port number indicating a network connection to the database. The configuration properties 140 may also include parameters that are associated with the respective property. For instance, the configuration property representing password may be associated with the parameter "foobar" that defines the password. Similarly, the configuration property 140 representing the port number can be associated, for example, with parameter number "3306" that represents the port number of the application server.

As shown, the application components 130 and associated configuration properties 140 can be stored in a component configuration file 144. Further description of generating and processing the component configuration file 144 is described below with respect to FIGS. 2 and 3. An application builder component 150 can process the application components 130 and the configuration properties 140 in the component configuration file 144 that represent application components and their associated configurations in the first computing environment. Based on such processing of the component configuration file 144, the application builder component 150 can generate instructions that facilitate execution of the application 124 in a target computing environment. Thus, the system 100 can automatically determine existing application components 130 to operate the application 124, can automatically determine associated configuration properties 140 for the application components, and based on such determinations, automatically generate instructions 154 that transform the application 124 to operate in the target computing environment. Such automated analysis and instruction generation provides substantial improvement in deployment cost, speed, and efficiency when migrating the application to the target computing environment over existing migration techniques. Further description of the automatic generation of the target computing environment instructions is provided below with respect to FIGS. 3 and 8.

Figure 2:
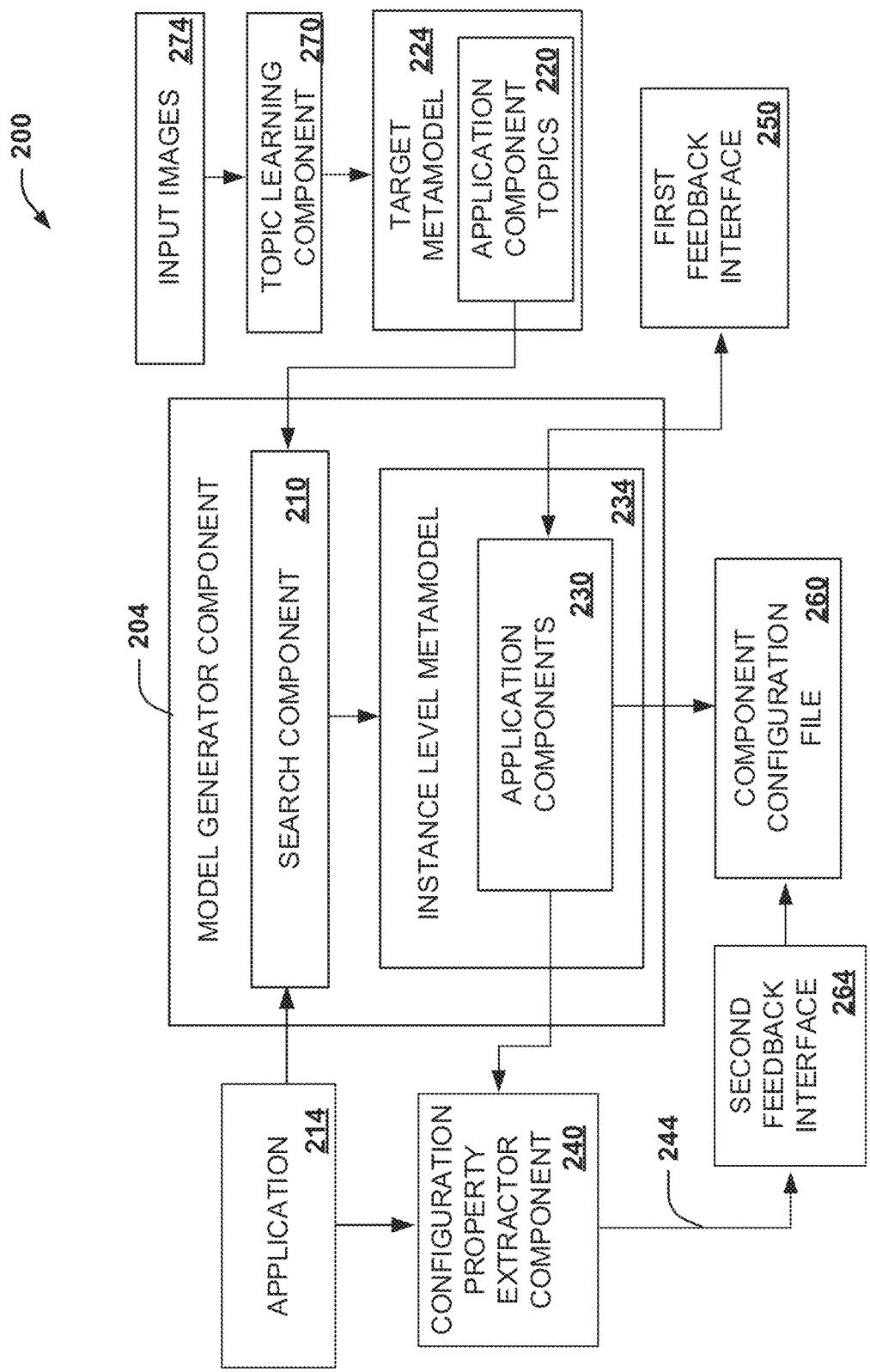
FIG. 2 illustrates a block diagram of an example, non-limiting system that can employ metamodels to facilitate automated transformation of an application from a first computing environment to a target computing environment in accordance with one or more embodiments described herein.

FIG. 2 illustrates an example, non-limiting system 200 that employs metamodels to facilitate automated transformation of an application from a first computing environment to a target computing environment in accordance with one or more embodiments described herein. Similar to the system 100 described above with respect to FIG. 1, the system 200 can include a model generator component 204 that can employ a search component 210 that can execute a search function on an application 214 based on a set of application component topics 220 that can be stored in a target metamodel 224 in this example. The search function of the search component 210 can retrieve application components 230 of the application 214 that can be stored in an instance level metamodel 234 and facilitate execution of the application in a first computing environment.

Before describing the respective metamodels, as used herein the term "model" refers to an abstracted language that describes various aspects of software functionality yet is not implemented as a specific computer language. One example of such modeling language that can create models is a Unified Modeling Language (UML) although other abstract modelling languages may be used. The models can represent different services in the system 200. The models can be developed according to Model-Driven Software Engineering (MDSE) paradigm in one example. Such models can be considered as primary artifacts from which parts of a software system can be automatically generated. As such, the models can be more abstract representations of the system to be built. Thus, MDSE can improve productivity and communication by supplying development technologies and tools in order to be suitably applied. Various example terms and approaches that are somewhat analogous to MDSE include model-driven architecture, model-driven engineering, and model-driven development. In some embodiments, any architecture that operates with models as described herein can be employed. The models can represent an abstraction of substantially all or some portion of an application 214 or application service for understanding the service functionalities before building the service into executable code. Models can act as a description of the domain of the system to be built and can focus on relevant aspects of the domain such as for example, a class diagram of the domain. As mentioned, the models can provide an abstract representation of the system to be built such as for example, where a component diagram specifies components of a system to be built.

As used herein, the term "metamodel" can be employed as a surrogate model for the underlying model representing application components for the instance level metamodel 234 or application component topics of the target metamodel 224. Thus, metamodels provide a simplified model or abstraction of an actual model that defines for example, a circuit, system, or software like entity. Metamodels can be a mathematical relation, tree structure, class diagram, or algorithm, for example, representing input and output relations. Since a model can be considered an abstraction of underlying executable objects for the application 214, the metamodel can provide yet another abstraction, highlighting properties of the model itself. Thus, a model can conform its associated metamodel in a manner that a computer program conforms to the grammar of the programming language in which it is written. Metamodeling can include the construction of terms within a given computing domain and can specify the output and input relationships representing that behavior.

In the example of the system 200, the term "instance level metamodel" refers to the application components that describe operation of the application 214 in the first computing environment. The term "target metamodel" refers to application component topics representing available resources of the target computing environment and that can be learned from a plurality of applications (e.g., from application images) that are operating in the target computing environment. As mentioned previously, a configuration property extractor component 240 can analyze the application 214 based on the application components 230 and can determine configuration properties 244 associated with operating the application components in the first computing environment. The model generator component 204 can generate the instance level metamodel 234 for the application 214 based on the search function of the search component 210 that describes the application components 230 that facilitate execution of the application in the first computing environment. As shown, a first feedback interface 250 having a first output and a first input (see e.g., FIG. 5), can be rendered by the model generator component 204. The first output can display the application components retrieved by the search function. The first input can receive user feedback that enables updating the instance level metamodel with application components that were not retrieved by the search function. In some cases, no user feedback may be used as the underlying retrieval of application components 230 may have been suitably captured according to the automated processes described herein.

The configuration property extractor component 240 can analyze related files of the application components 230 and can employ a first machine learning component (not shown) that learns from the related files of the application components and extracts parameters that define the configuration properties 244 in response to the learning that enable configuration of the application components in the first computing environment. The first machine learning component can be an artificial intelligence classifier or a neural network, for example, that employs a bidirectional long short-term memory (BI-LSTM) network that performs the learning. The BI-LSTM network is described below with respect to FIGS. 6 and 7.

A component configuration file 260 can be provided that can store the application components 230, the configuration properties 244, and associated parameters. The model generator component 204 can store the application components 230 retrieved by the search function to the component configuration file 260 and the configuration property extractor component 240 can store the configuration properties 244 and associated parameters learned from analyzing the related files of the application components in the component configuration file 260. A second feedback interface 264 can be provided having a second output and a second input that is rendered by the model generator component 204 (see e.g., FIG. 6). The second output displays the configuration properties 244 and associated parameters in the component configuration file, wherein the second input receives user feedback that enables updating the component configuration file 260 with configuration properties 244 and associated parameters that were not determined by the configuration property extractor component 240. In some cases, no user feedback may be used as the underlying retrieval of configuration properties 244 may have been suitably captured according to the automated extraction processes described herein.

The target metamodel 224 and associated application component topics 220 can be generated by a topic learning component 270 that can learn from a plurality of input images 274. The input images 274 can describe computing resources available to applications operating in the target computing environment from which the application component topics 220 can be learned. Further description of the topic learning component 270 and processing of the input images 274 is provided below with respect to FIGS. 3 and 4.

Figure 3:
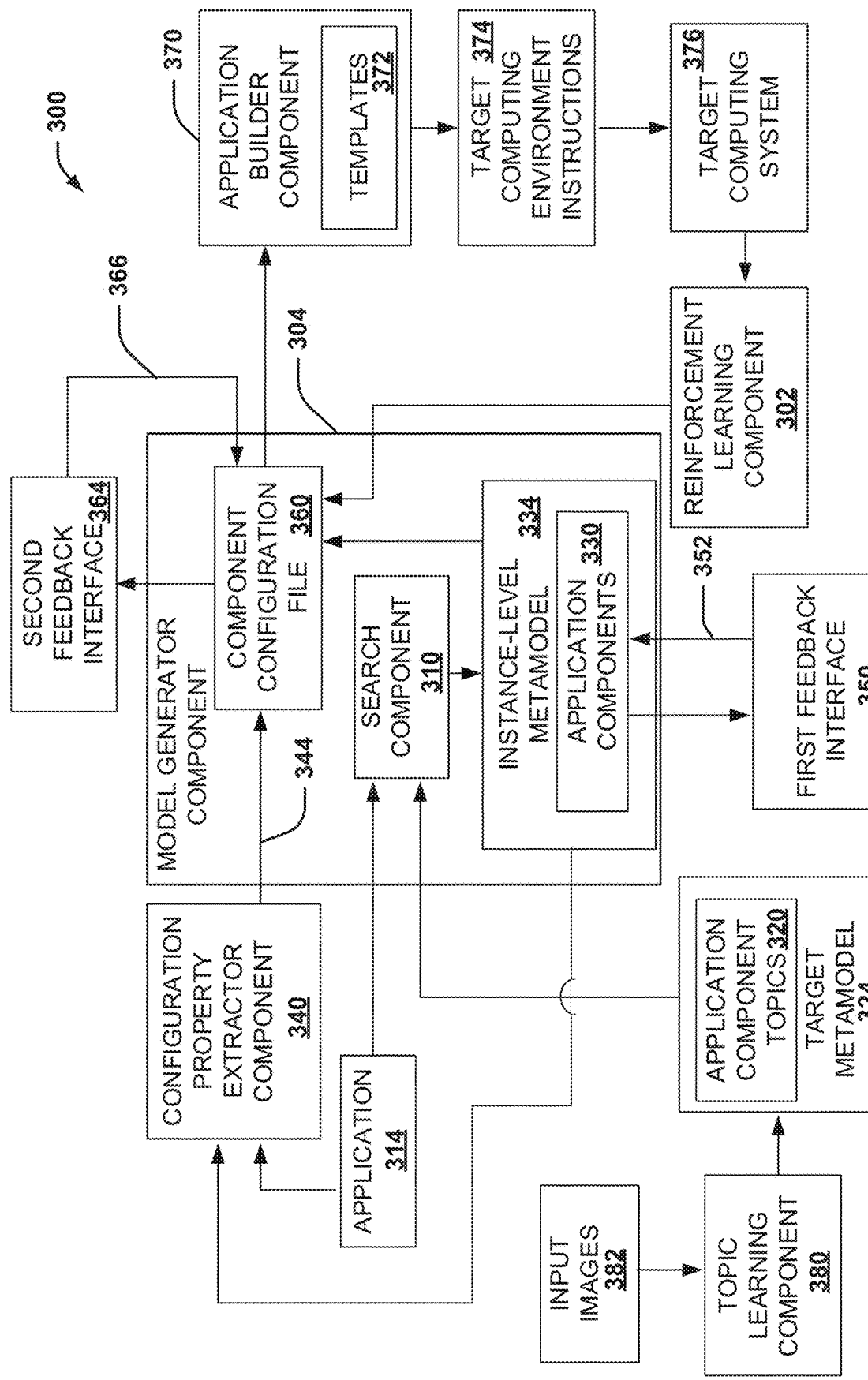
FIG. 3 illustrates a block diagram of an example, non-limiting system that includes a reinforcement learning component that can facilitate automated transformation of an application from a first computing environment to a target computing environment in accordance with one or more embodiments described herein.

FIG. 3 illustrates an example, non-limiting system 300 that includes a reinforcement learning component 302 to facilitate automated transformation of an application from a first computing environment to a target computing environment in accordance with one or more embodiments described herein. Similar to the system 200 described above with respect to FIG. 2, the system 300 can include a model generator component 304 that can employ a search component 310 that can execute a search function on an application 314 based on a set of application component topics 320 that can be stored in a target metamodel 324 in this example. The search function of the search component 310 can retrieve application components 330 of the application 314 that can be specified and stored as an instance level metamodel 334 and facilitate execution of the application in a first computing environment.

A configuration property extractor component 340 can analyze the application 314 based on the application components 330 and can determine configuration properties 344 associated with operating the application components in the first computing environment. The model generator component 304 can generate the instance level metamodel 334 for the application 314 based on the search function of the search component 310 that describes the application components 330 that facilitate execution of the application in the first computing environment. As shown, a first feedback interface 350 having a first output and a first input (see e.g., FIG. 5), can be rendered by the model generator component 304. The first output can display the application components 330 retrieved by the search function. The first input can receive user feedback 352 that enables updating the instance level metamodel 334 with application components 330 that were not retrieved by the search function. As mentioned previously, in some cases, no user feedback may be used as the underlying retrieval of application components 330 may have been suitably captured according to the automated processes described herein.

The configuration property extractor component 340 can analyze related files of the application components 330 and can employ a first machine learning component (not shown) that learns from the related files of the application components and extracts parameters that define the configuration properties 344 in response to the learning that enable configuration of the application components in the first computing environment. The first machine learning component can be an artificial intelligence classifier or a neural network, for example that employs a bidirectional long short-term memory (BI-LSTM) network that performs the learning. The BI-LSTM network is described below with respect to FIGS. 6 and 7.

A component configuration file 360 can be provided that can store the instance level metamodel 334 that specifies the application components 330. The component configuration file 360 can also store the configuration properties 344 and associated parameters described herein. The model generator component 304 can store the application components 330 of the instance-level metamodel 334 in the component configuration file 360 that are retrieved by the search function. The configuration property extractor component 340 can store the configuration properties 344 and associated parameters in the component configuration file 360 that have been learned from analyzing the related files of the application components 330. A second feedback interface 364 can be provided having a second output and a second input that is rendered by the model generator component 304 (see e.g., FIG. 6). The second output displays the configuration properties 344 and associated parameters in the component configuration file 360, wherein the second input receives user feedback 366 that enables updating the component configuration file 360 with configuration properties 344 and associated parameters that were not determined by the configuration property extractor component 340. As mentioned previously, in some cases, no user feedback 366 may be used as the underlying retrieval of configuration properties 344 may have been suitably captured according to the automated extraction processes described herein.

An application builder component 370 can store templates 372 that describe target computing operations of the application components 330 of the instance-level metamodel 334 and stored in the component configuration file 360. The application builder component 370 can update the templates 372 with the configuration properties 344 and associated parameters for the respective application components 330 in the component configuration file 360 and can generate target computing environment instructions 374 based on the updates. In an example embodiment, the application builder component 370 can generate output images from the updated templates 372 representing the target computing environment instructions 374. In some examples, the output images instruct a target computing system 376 to execute the application 314 and associated application components 330 in a cloud computing environment.

As used herein, the terms "input images" and "output images" refer to computing instructions that operate applications using cloud resources. In one example embodiment, the respective images can be constructed according to Docker protocols that are executable in a cloud environment. A Docker image, for example, can be constructed from a series of layers, where each layer represents an instruction in the image's respective Dockerfile, wherein the various layers define instructions for executing applications in a cloud environment. Although Docker provides a common platform for describing and executing cloud-computing operations, other protocols are possible. These can include substantially any cloud computing executable protocols/languages such as defined for example, by RKT for Linux® clusters, LXC Linux® Containers, OpenVZ,®, or Apache® Mesos. In other example embodiments, substantially any type of instructions compatible with the target computing environment can be employed.

The reinforcement learning component 302 can employ a second machine learning component that learns from execution of the application 314 and associated application components 330 in the target computing environment by the target computing system 376. The reinforcement learning component 302 can update the component configuration file 360 based on the learning that facilitates discovery of uncovered, erroneous, or missing dependencies between application components 330 and associated configuration properties 344 or parameters based upon execution of the application 314 to the target computing environment.

As mentioned previously, a topic learning component 380 can employ a third machine learning component that learns from words or phrases within input images 382 that describe execution of a plurality of deployed target computing applications. The topic learning component 380 can generate the target metamodel 324 that stores the set of application component topics 320 based on the learning. The application component topics 320 can describe computing resources available to the application 314 in the target computing environment. For example, the computing resources can include at least one of a database, operating system, or application server. In other example embodiments, the computing resources can include substantially any resource such as provided by another application that supports the application 314. The third machine learning component can be an artificial intelligence classifier or a neural network that employs a Latent Dirichlet Allocation (LDA) component (described below with respect to FIG. 4) that identifies the set of application component topics 320 from the words or phrases within the input images 382 where the input images can include instructions that can execute the deployed applications in a cloud computing environment, for example.

In some examples, the search function of the search component 310 can be executed by a search engine that retrieves the application components 330 from the application 314 based on searching with words associated with the application component topics 320. In an example embodiment, the search engine can be a crawler search engine or an elastic search engine which is described below with respect to FIG. 5. One example of an elastic search engine is provided by "Elasticsearch" that is a scalable open-source full-text search and analytics engine. It allows applications to store, search, and analyze large volumes of data quickly and in a timely manner. In other example embodiments, any search engine can be utilized to execute the search function of the search component 310.

Figure 4:
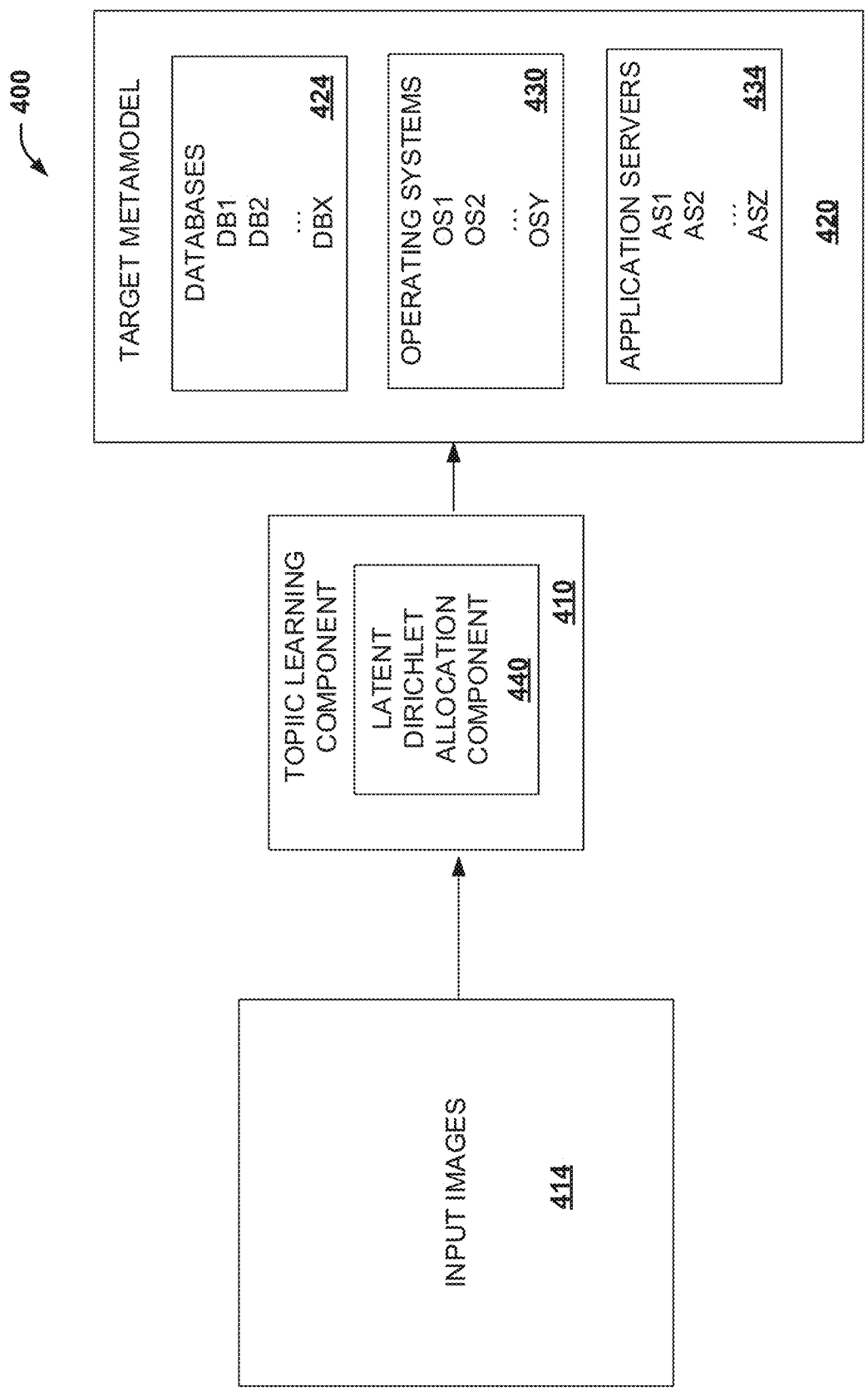
FIG. 4 illustrates a block diagram of an example, non-limiting system that can employ a topic learning component to determine application component topics from input images to facilitate automated transformation of an application from a first computing environment to a target computing environment in accordance with one or more embodiments described herein.

FIG. 4 illustrates an example, non-limiting system 400 that can employ a topic learning component 410 to determine application component topics from input images 414 to facilitate automated transformation of an application from a first computing environment to a target computing environment in accordance with one or more embodiments described herein. The input images 414 can describe resources that are used by different applications in the target computing environment. As mentioned previously, such resources can, for example, include databases, application servers, operating systems, or related services. The input images can be processed by the topic learning component 410 to generate a topic metamodel 420 that in this example, stores learned application component topics learned database types 424 shown as DB1 though DBX, operating system types shown as OS1 through OSY 430, and application server types shown as AS1 through ASX, where X, Y, and Z represent positive integers.

In this example, the topic learning component 410 can employ a Latent Dirichlet Allocation (LDA) component 440 to learn words and phrases from the input images 414 that facilitate generation of the target metamodel 420 and application component topics stored therein based on the learning. In other example embodiments, substantially any type of machine learning to perform topic modeling can be employed including a Named Entity Recognition component in place of the LDA component 440. In language processing, for example, the LDA component can be implemented as a generative statistical model that allows sets of observations on words or phrases to be explained by unobserved groups that explain why some parts of the data are similar. For example, if observations are words collected into documents, it follows that each input image 414 can a mixture of a small number of topics and that each word's presence is attributable to one of the document's topics. Thus, the LDA component 440 provides an example of a topic model that is a form of artificial intelligence such as provided by machine learning, classifiers, or neural networks.

Figure 5:
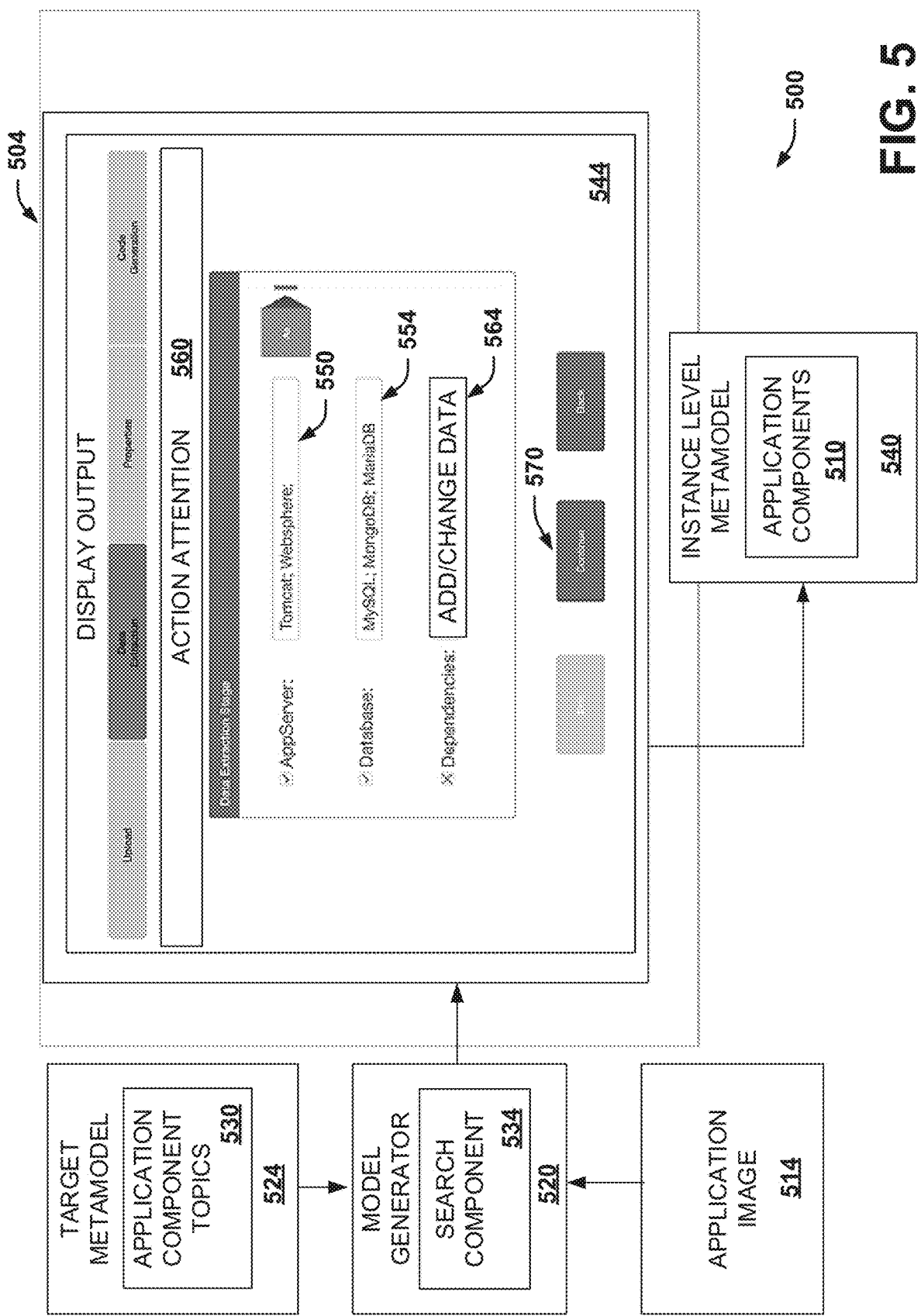
FIG. 5 illustrates a block diagram of an example, non-limiting system that can employ a first feedback interface that can augment retrieved application components to facilitate automated transformation of an application from a first computing environment to a target computing environment in accordance with one or more embodiments described herein.

FIG. 5 illustrates an example, non-limiting system 500 that can employ a first feedback interface 504 that can augment retrieved application components 510 to facilitate automated transformation of an application from a first computing environment to a target computing environment in accordance with one or more embodiments described herein. In this example, the applications described above can be represented as an application image 514 as it exists in a first computing environment. An example of such image is shown in Table 1:

TABLE 1

Application (e.g., jpestore)
    help.html
    images
    index.html
    META-INF
        applicationContext.xml
        attachments
        dataAccessContext.jta.xml
        dataAccessContext.local.xml
        jdbc.properties
        jsp
        lib
        log4j.properties
        mail.properties
        petstore-servlet.xml TABLE 1-continued remoting-servlet.xml
        server-config.wsdd
        sql-map-config.xml
        struts-config.xml
        web.xml A model generator component 520 can process the application image 514 and a target metamodel 524 that can include application component topics 530 that can be learned from application images of a target computing environment such as described above with respect to FIGS. 1-4. The model generator component 520 can employ a search component 534 (e.g., search engine) that searches for words or phrases in the application image 514 that can indicate the application components 510 of an instance level metamodel 540. The first feedback interface 504 can be dynamically generated by the model generator component 520 to enable a user to update the instance level metamodel 540 if desired. For example, if missing components or data is missing from based on the search function of the search component 534 in response to the application component topics 530, a display output 544 can be provided on the first feedback interface 504 to highlight missing (or erroneous) items uncovered by the search. In this example, compatible application servers and databases were found and displayed at 550 and 554, respectively.

An action field 560 can be provided that can alert the user's attention that one or more items may be missing from the respective search. In this example, if the action field 560 is displayed, an input location at 564 can be provided to enable the user to enter missing data and/or correct erroneous data uncovered by the search. A plurality of such input locations can be provided depending on the number of such items found. In some examples, no input locations may be generated at 564 indicating that suitable relevant items were found to describe the application components 510. Upon entering data at 564 (if any), the user can select a confirm button at 570 to complete generation of the instance level metamodel 540.

Figure 6:
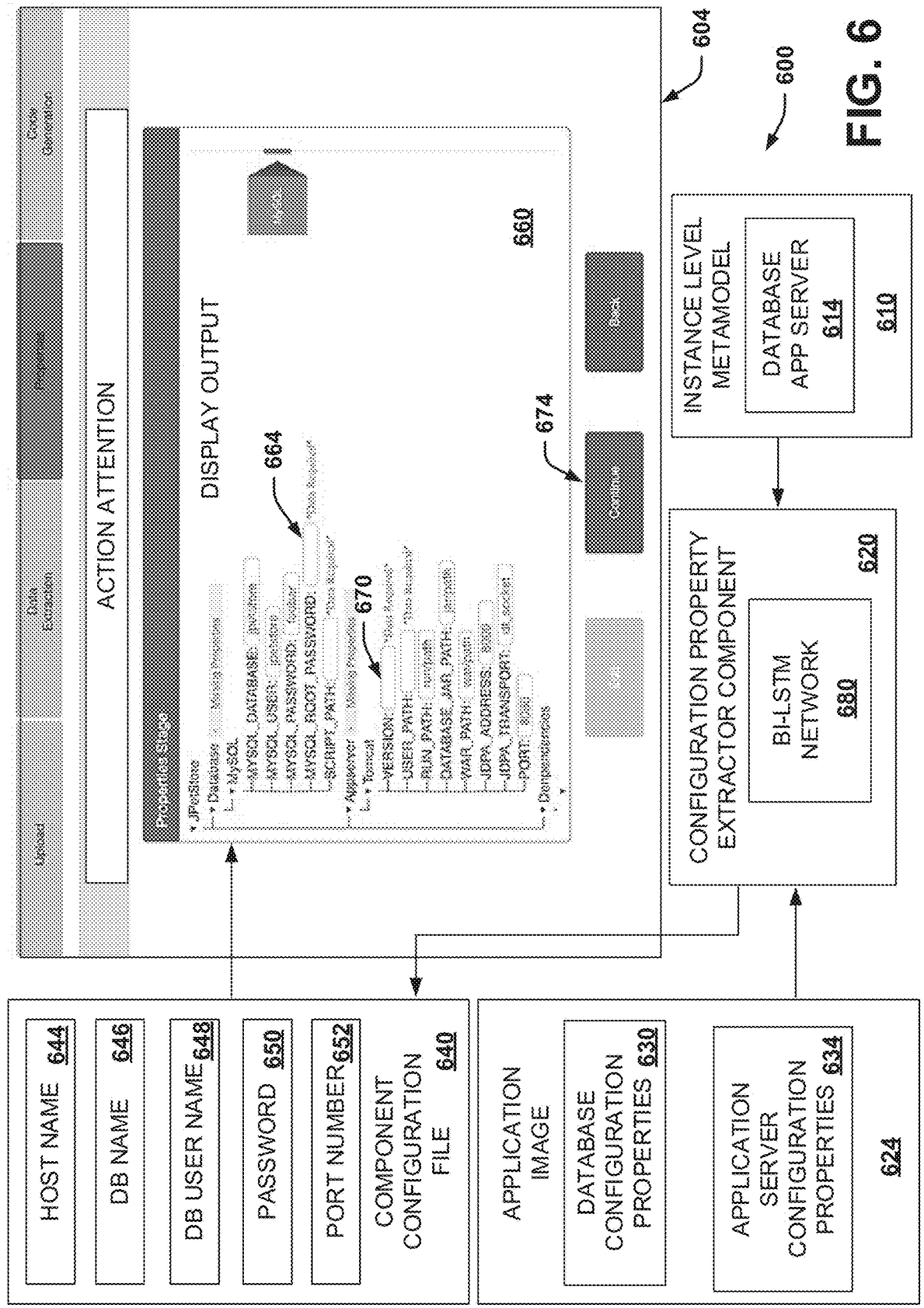
FIG. 6 illustrates a block diagram of an example, non-limiting system that can employ a second feedback interface that can augment extracted configuration properties to facilitate automated transformation of an application from a first computing environment to a target computing environment in accordance with one or more embodiments described herein.

FIG. 6 illustrates an example, non-limiting system 600 that can employ a second feedback interface 604 that can augment extracted configuration properties to facilitate automated transformation of an application from a first computing environment to a target computing environment in accordance with one or more embodiments described herein. In this example, an instance level metamodel 610 having application components 614 which are depicted as a database and an application server, can be processed by a configuration property extractor component 620 along with an application image 624. As shown, the application image 624 can include database configuration properties and application server configuration properties 634.

Based on the instance level metamodel 610 and the application image 624, the configuration property extractor component 620 can generate a component configuration file 640 that stores extracted configuration properties and associated configuration parameters for respective database and application server. As shown, example configuration parameters in the component configuration file 640 can include a host name 644 for the application server, a database name 646 for the database, a database username 648, a password 650 for the application server, and a port number 652 to enable network connections to the database and/or application server. An example, of configuration properties extracted is depicted in Table 2, and an example of configuration parameters extracted is depicted in Table 3.

TABLE 2 jdbc.driverClassName=com.mysql.jdbc.Driver
jdbc.url=jdbc:mysql://db:3306/jpetstore
jdbc.username=jpetstore
jdbc.password=footbar

TABLE 3

```
<context-param>
    <param-name>dbUser</param-name>
    <param-value>root</param-value>
</context-param>
<context-param>
    <param-name>dbPassword</param-name>
    <param-value>foobar</param-value>
</context-param>
<context-param>
    <param-name>dbURL</param-name>
    <param-value>jdbc:mysql://localhost:3306/UserDB</param-value>
</context-param>
<context-param>
```

As shown, the second feedback interface 604 can include a display output 660 that can display extracted parameters, missing parameters, or erroneous parameters in the component configuration file 640. In some cases, missing data can be requested to be supplied by a user such as shown at 664 requesting a root password for a database server (e.g., SQL server) and at 670 requesting version data for the application server. A confirm input 674 can be selected based upon missing properties and/or parameters being entered that confirms that configuration properties have been extracted for the application image 624. In some examples, as mentioned previously, no user input may be requested via the second feedback interface 604 if the configuration properties and parameters extracted in the component configuration file 640 are deemed suitable.

The example configuration property extractor component 620 can include neural network learning to facilitate extraction as described herein although as mentioned previously, substantially any type of machine learning can be employed. In this example, a configuration property extractor component 620 can include a bidirectional Long Short-Term Memory (BI-LSTM) network 680 to perform learning and is depicted and described below with respect to FIG. 7. The BI-LSTM network 680 can include layer processing (see e.g., FIG. 7) causing duplicating a first recurrent layer in the network such that there are two (or more layers side-by-side, then providing the input sequence (e.g., words indication properties or parameters) as input to the first layer and providing a reversed copy of the input sequence to the second. This can be extrapolated to more than two learning layers such as depicted in FIG. 7.

Figure 7:
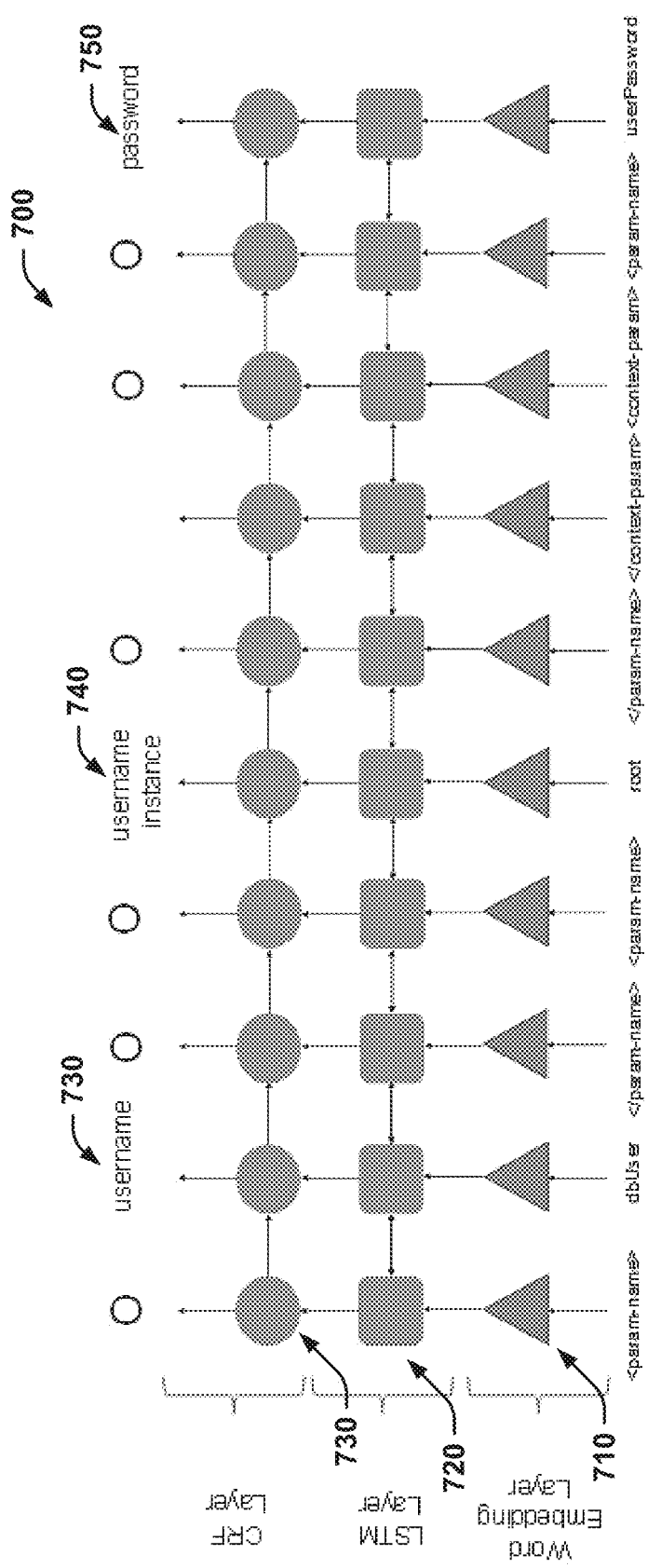
FIG. 7 illustrates a block diagram of an example, non-limiting learning network that can extract extracted configuration properties and associated parameters to facilitate automated transformation of an application from a first computing environment to a target computing environment in accordance with one or more embodiments described herein.

FIG. 7 illustrates an example, non-limiting learning network 700 that can extract extracted configuration properties and associated parameters to facilitate automated transformation of an application from a first computing environment to a target computing environment in accordance with one or more embodiments described herein. As shown, a first layer 710 (e.g., word embedding layer) of learning network 700 (e.g., BI-LSTM network) can receive input as words (or phrases) such as from an application image and/or instance level metamodel as previously described. An LSTM layer 720 can receive output from the first layer and perform learning that begins to tie isolated concepts from the first layer 700 such as such as a database user and a parameter name which can be learned through a Conditional Random Field (CRF) layer 730 and can be generated as output from the learning network 700 as a username 740 for the database user based on network learning. As shown, from the words analyzed at the input 710 to the learning network 700, other configuration properties and/or parameters can be extracted such as for example, a username instance 740 and password 750.

Figure 8:
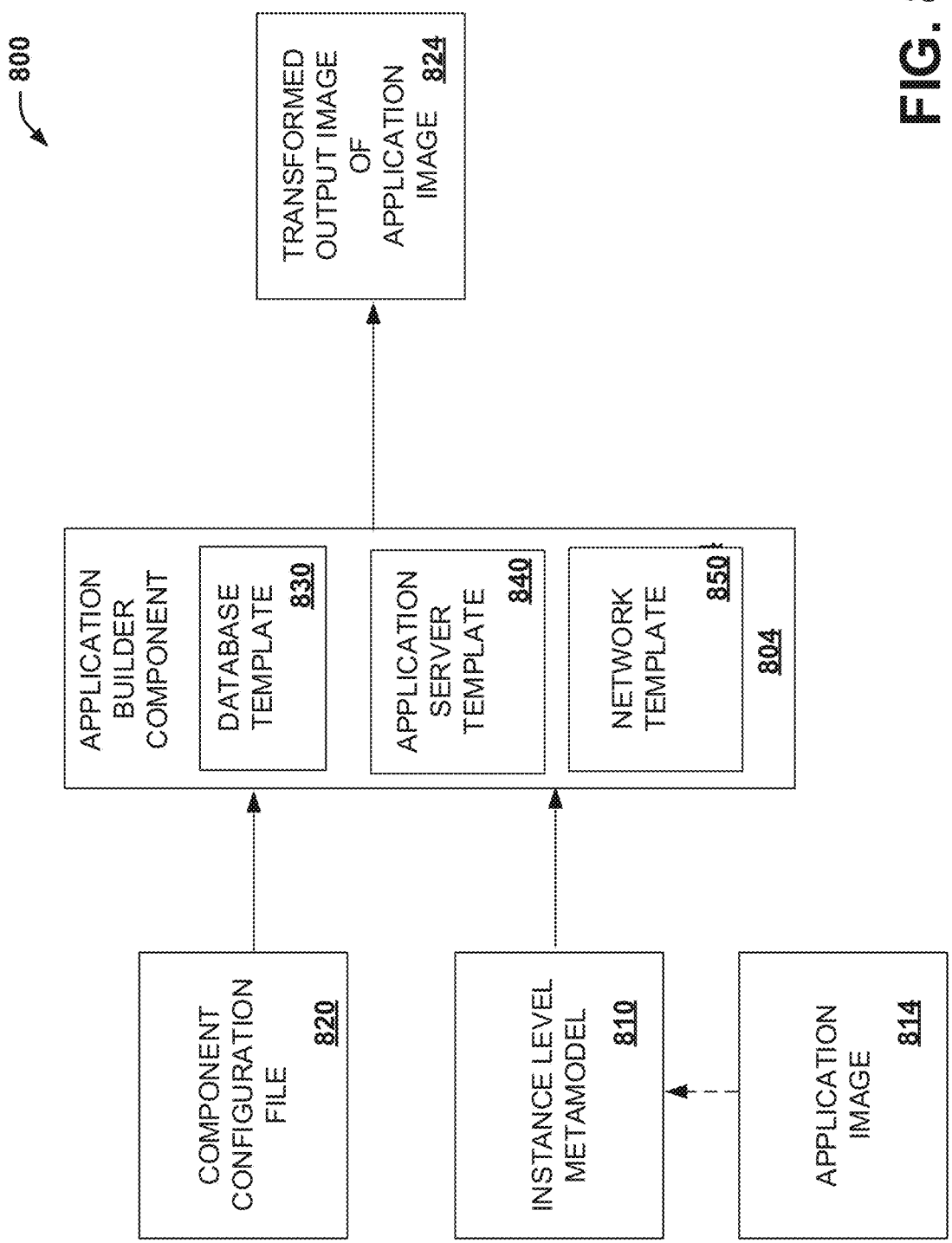
FIG. 8 illustrates a block diagram of an example, non-limiting system that includes an application builder component to facilitate automated transformation of an application from a first computing environment to a target computing environment in accordance with one or more embodiments described herein.

FIG. 8 illustrates an example, non-limiting system 800 that includes an application builder component 804 to facilitate automated transformation of an application from a first computing environment to a target computing environment in accordance with one or more embodiments described herein. In this example, an instance level metamodel 810 can be generated as described previously from an application image 814 (see e.g., Table 1 for image example). The application builder component 804 receives the instance level metamodel 810 and component configuration file 820 and can automatically generate a transformed output image 824 that can be executed in the target computing environment. The transformed output image 824 as previously mentioned, can be generated by searching and learning from the application image 814 that operates in its first computing environment. An example of a transformed output image 824 is depicted in Table 4:

TABLE 4

```
appserver
    app
        jpetstore
        pom.xml
    Dockerfile
    tomcat
        mysql-connector-java-8.0.16.jar
        run.sh
        tomcat-users.xml
    war
        jpetstore.war
database
    Dockerfile
    sql-scripts
        jpetstore-sql-script.sql
docker-compose.yml
```

As mentioned previously, the application builder component can include templates that describe instructions and operations of computing resources in the target computing environment. The templates can be configured by the application builder component 804 based on contents of the instance level metamodel 810 and/or the component configuration file 820 to enable the applications operating in a given computing environment to be operated in the target computing environment. An example database template is depicted in Table 5, an example application server template 840 is depicted in Table 6, and an example network template is depicted in Table 7:

TABLE 5

```
FROM mysql:latest
# Add database configurations
ENV MYSQL_DATABASE=jpetstore
ENV MYSQL_USER=jpetstore
ENV MYSQL_PASSWORD=foobar
ENV MYSQL_ROOT_PASSWORD=foobar
# Copy the database initialize script:
COPY ./sql-scripts/ /docker-entrypoint-initdb.d/
```

TABLE 6

```

#Deploy the application to tomcat

FROM tomcat: 8.0.20-j re8
LABAL maintained" Anup Kalia anup.kalia@ibm.com"
# tomcat-users.xml sets up user accounts for the Tomcat manager GUI
ADD tomcat/tomcat-user.xml $CATALINA_HOME/conf/
# ADD tomcat/catalina.sh $CATALINA_HOME/bin/
ADD tomcat/run.sh $CATALINA_HOME/bin/run.sh
RUN chmod +x $CATALINA_HOME/bin/run.sh
# add MySQL JDBC driver jar
ADD tomcat/mysql-connector-java-8.0.16.jar SCATALINA_HOME/lib/
# create mount point for volume with application
WORKDIR $CATALINA_HOME/webapps/
COPY ./war/jpetstore.war SCATALINA_HOME/webapps/jpetstore.war
# add tomcat jpda debgging environmental variables
#ENV JPDA_ADDRESS="8000"
#ENV JPDA_TRANSPORT="dt_socket"
# start tomcat 18
EXPOSE 8080
```

TABLE 7

```
docker build -t db database/.
docker build -t jpetstore appserver/.
docker network create jnw
docker run -d -p 3306:3306 --net=jnw --name=db db
docker run -d -p 8080:8080 --net=jnw --name=jpetstore jpetstore
```

Figure 9:
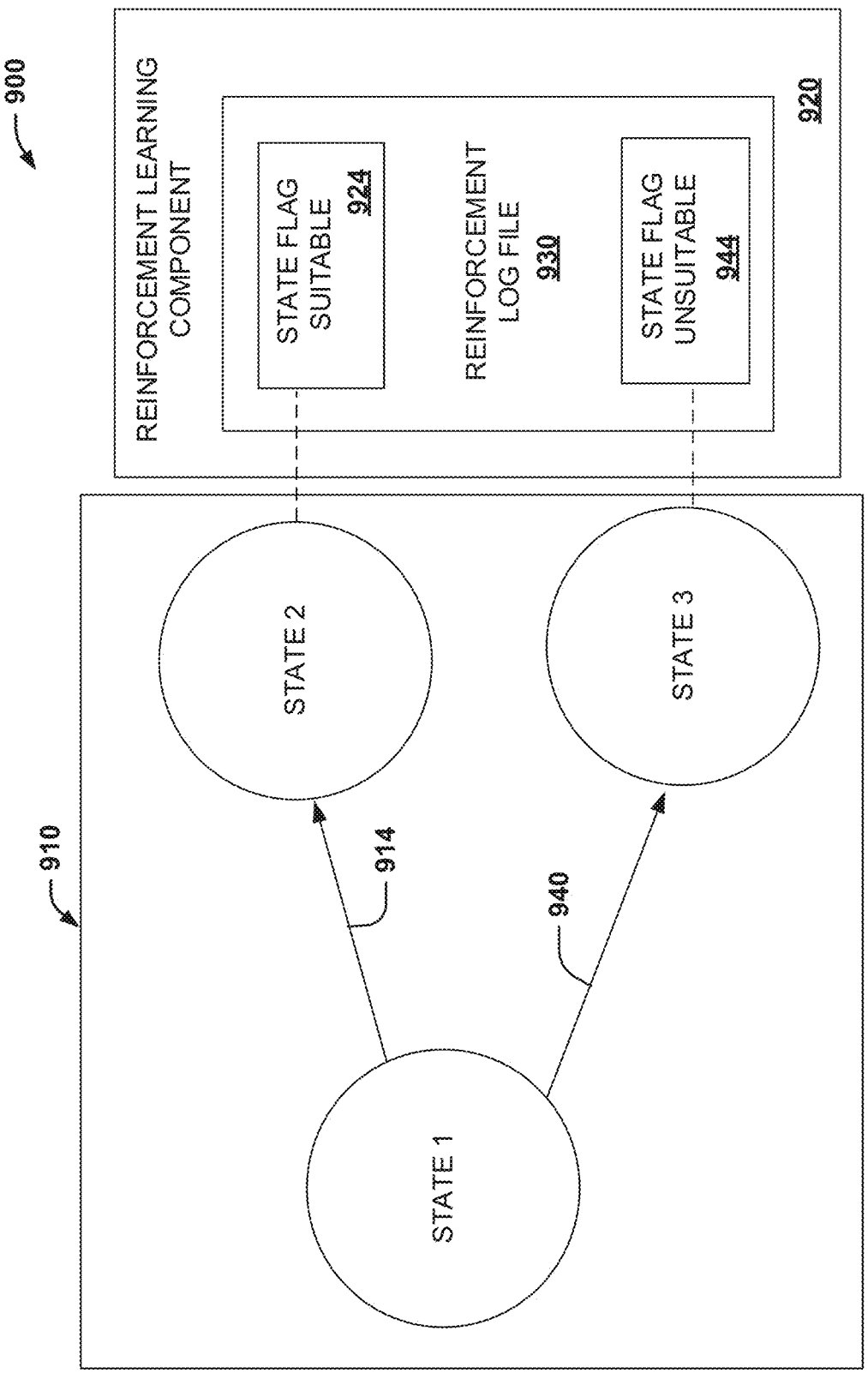
FIG. 9 illustrates a block diagram of an example, non-limiting system and state diagram depicting reinforcement learning to facilitate automated transformation of an application from a first computing environment to a target computing environment in accordance with one or more embodiments described herein.

FIG. 9 illustrates an example, non-limiting system 900 and state diagram 910 depicting an example of reinforcement learning to facilitate automated transformation of an application from a first computing environment to a target computing environment in accordance with one or more embodiments described herein. As shown, the state diagram 900 includes three example states State 1, State 2, and State 3, for monitoring execution of a transformed application in the target computing environment as described herein. It is noted however, more or less than three states may be tested depending on the underlying application and/or actions that invoke transitions to other states and/or between states. In this example, State 1 of the application example such as described above with respect to FIG. 8, may depict a graphic image of a selected pet such as a bird, dog, cat, or fish.

An action 914 (e.g., mouse click) detected by the application when running in the target environment causes a state transition from State 1 to State 2 of the application and can invoke a sequence such as a function call and a method call. As shown, a reinforcement learning component 920 can include a classifier or neural network, for example, that is trained to monitor application state transitions and determine if the next state has been suitably executed. If successful, which is the case for State 2 in this example, a state flag can be set at 924 of a reinforcement log file 930 indicating that successful functions and methods of the application were executed based on transitioning to State 2. In response to another action, causing a transition 940 to State 3, a state flag at 944 can be set as unsuitable that can indicate a detected problem with the respective action. In this example, a sequence of calls can be executed including a function call, a method call, that also can be related to the configuration properties described herein (e.g., call to database server having improper server name). An interface (not shown) can be displayed based on setting the flag 944, allowing the user to correct one or more of the configuration properties. Such corrections can also be fed back from the reinforcement learning component 920 to the respective model builder components described herein to facilitate improving the model building process for other applications to be transformed.

Figure 10:
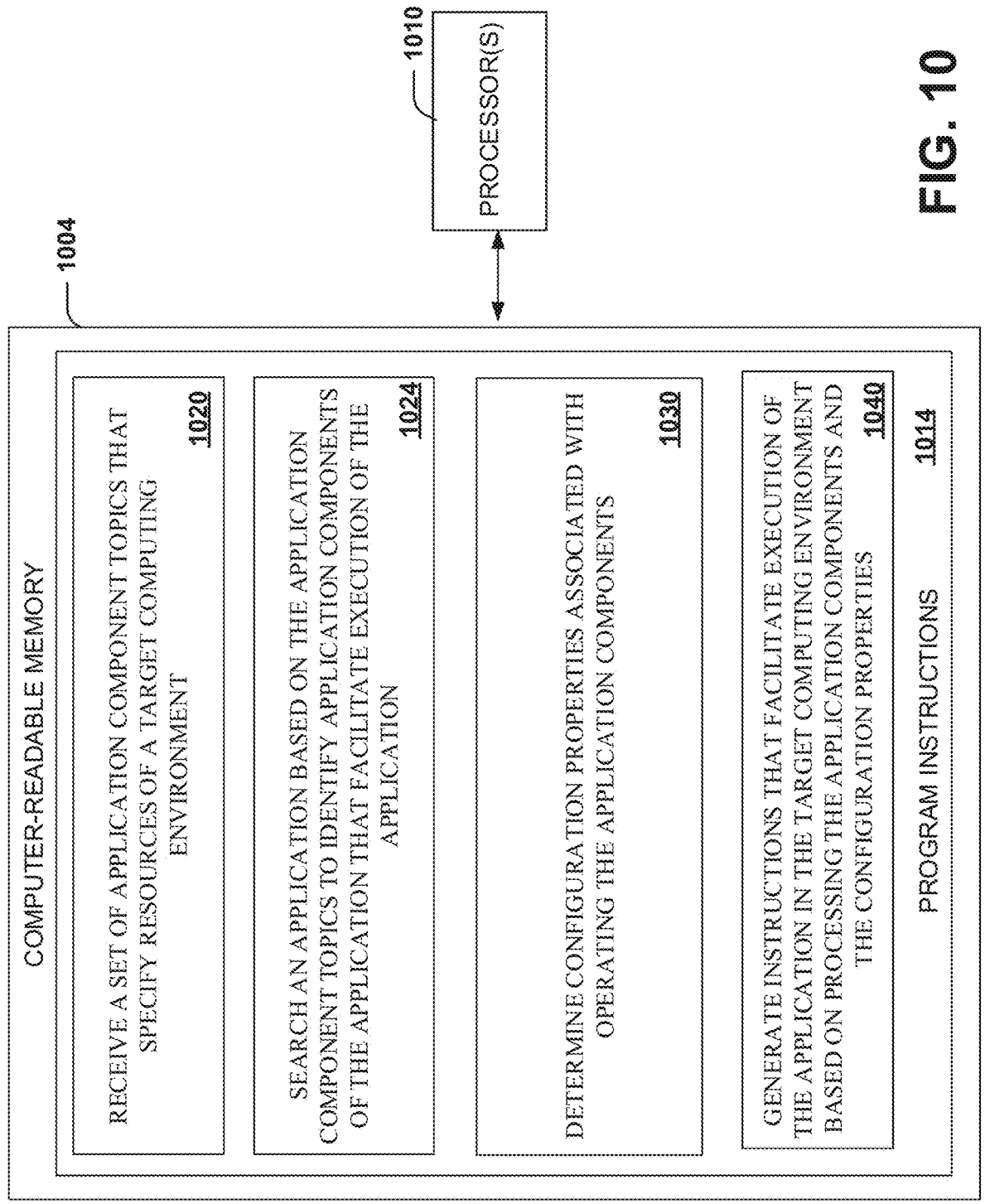
FIG. 10 illustrates a block diagram of an example, non-limiting computer-readable memory having executing program instructions stored thereon that facilitates migration of application operations from a first computing environment to a target computing environment in accordance with one or more embodiments described herein.

FIG. 10 illustrates an example, non-limiting computer-readable memory 1004 having executable program instructions stored thereon operated by a processor 1010 (or processors) that facilitates migration of application operations from a first computing environment to a target computing environment in accordance with one or more embodiments described herein. At 1020, the program instructions 1014 can cause the processor 1010 to receive a set of application component topics that specify resources of a target computing environment. At 1030, the program instructions 1014 can cause the processor to search an application based on the application component topics to identify application components of the application that facilitate execution of the application. At 1040, the program instructions 1014 can determine configuration properties associated with operating the application components. At 1050, the program instructions 1014 can generate instructions that facilitate execution of the application in the target computing environment based on processing the application components and the configuration properties.

Figure 11:
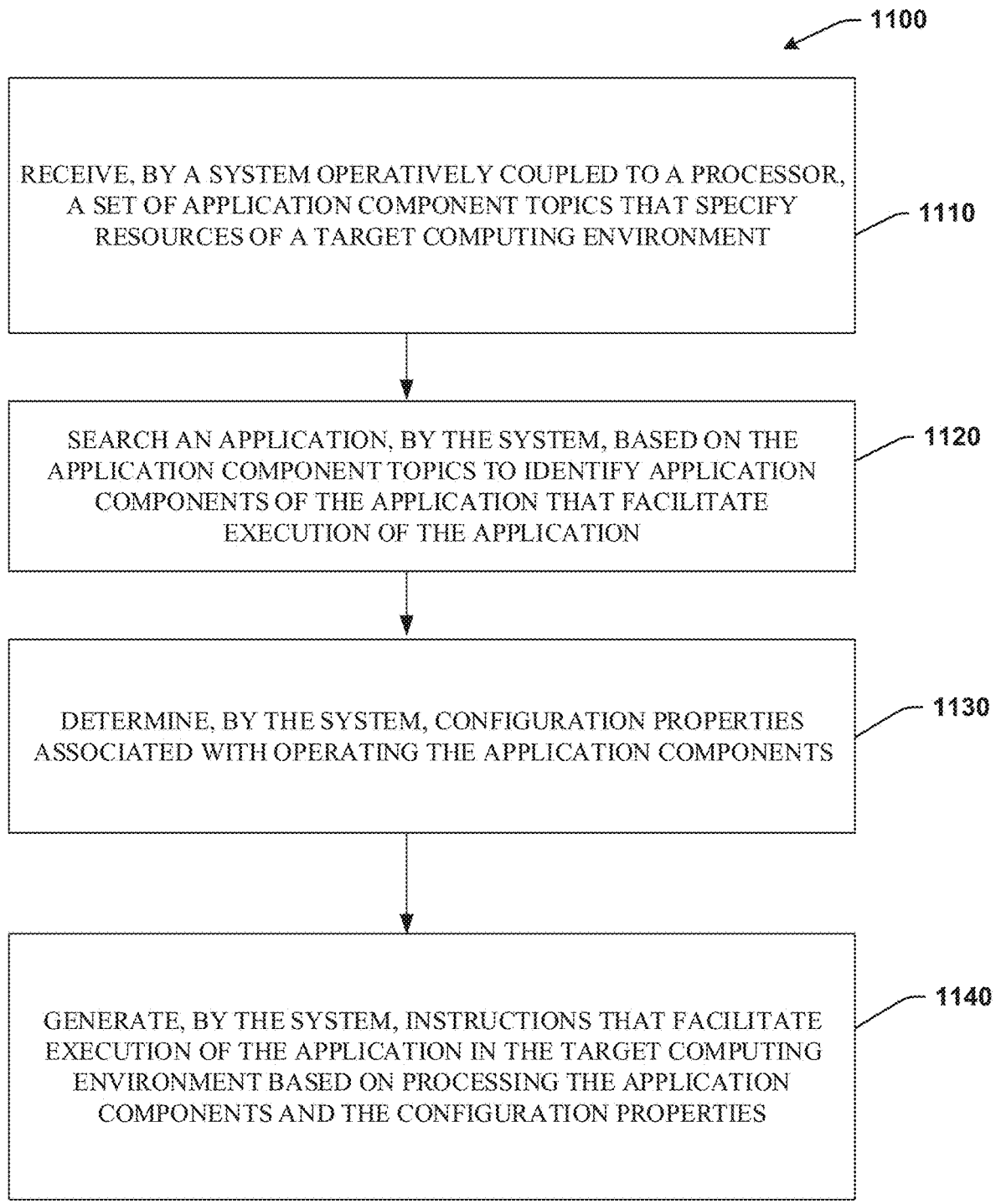
FIG. 11 illustrates a flow diagram of an example, computer-implemented method that migration of application operations from a first computing environment to a target computing environment in accordance with one or more embodiments described herein.

FIG. 11 illustrates a computer-implemented methodology 1100 via flow diagram in accordance with the disclosed subject matter herein. Methodology and process flows related to FIG. 11 implementing the method are also depicted and described above with respect to FIGS. 1 through 9. For simplicity of explanation, the methodology is depicted and described as a series of acts. It is to be understood and appreciated that the subject methodology is not limited by the acts illustrated and/or by the order of acts, for example acts can occur in various orders and/or concurrently, and with other acts not presented and described herein. Furthermore, not all illustrated acts may be employed to implement the methodology in accordance with the disclosed subject matter. In addition, those skilled in the art will understand and appreciate that the methodology could alternatively be represented as a series of interrelated states via a state diagram or events. Additionally, it should be further appreciated that the methodology disclosed hereinafter and throughout this specification are capable of being stored on an article of manufacture to facilitate transporting and transferring such methodologies to computers. The term "article of manufacture", as used herein, is intended to encompass a computer program accessible from any suitable computer/machine-readable device and/or storage media.

FIG. 11 illustrates an example non-limiting computer-implemented method 1100 that facilitates transformation of applications from a first computing environment to a target computing environment in accordance with one or more embodiments described herein. FIG. 11 illustrates a computer-implemented methodology via flow diagram in accordance with the disclosed subject matter herein. At 1110, the computer-implemented method 1100 can include receiving, by a system operatively coupled to a processor, a set of application component topics that specify resources of a target computing environment (e.g., via model generator component 114 of FIG. 1). At 1120, the computer-implemented method 1100 can include searching an application, by the system, based on the application component topics to identify application components of the application that facilitate execution of the application (e.g., via search component 120 of FIG. 1). At 1130, the computer-implemented method 1100 can include determining, by the system, configuration properties associated with operating the application components (e.g., via configuration property extractor component 134 of FIG. 1). At 1140, the computer-implemented method 1100 can include generating, by the system, instructions that facilitate execution of the application in the target computing environment based on processing the application components and the configuration properties (e.g., via application builder component 150 of FIG. 1).

Although not shown the computer-implemented method 1100 can also include generating, by the system, an instance level metamodel for the application based on the search function that describes the application components that facilitate execution of the application in the first computing environment (e.g., via model generator component 114 of FIG. 1). The computer-implemented method 1100 can also include learning, by the system. the set of application component topics from words or phrases within input images that describe execution of a plurality of deployed target computing applications (e.g., via topic learning component 270 of FIG. 2). This can include generating, by the system, a target metamodel that stores the set of application component topics based on the learning (e.g., via topic learning component 270 of FIG. 2). The computer-implemented method 1100 can also include updating, by the system, templates that describe operations of the application components and determined configuration properties in the target computing environment (e.g., via application builder component 150 of FIG. 1).

Figure 12:
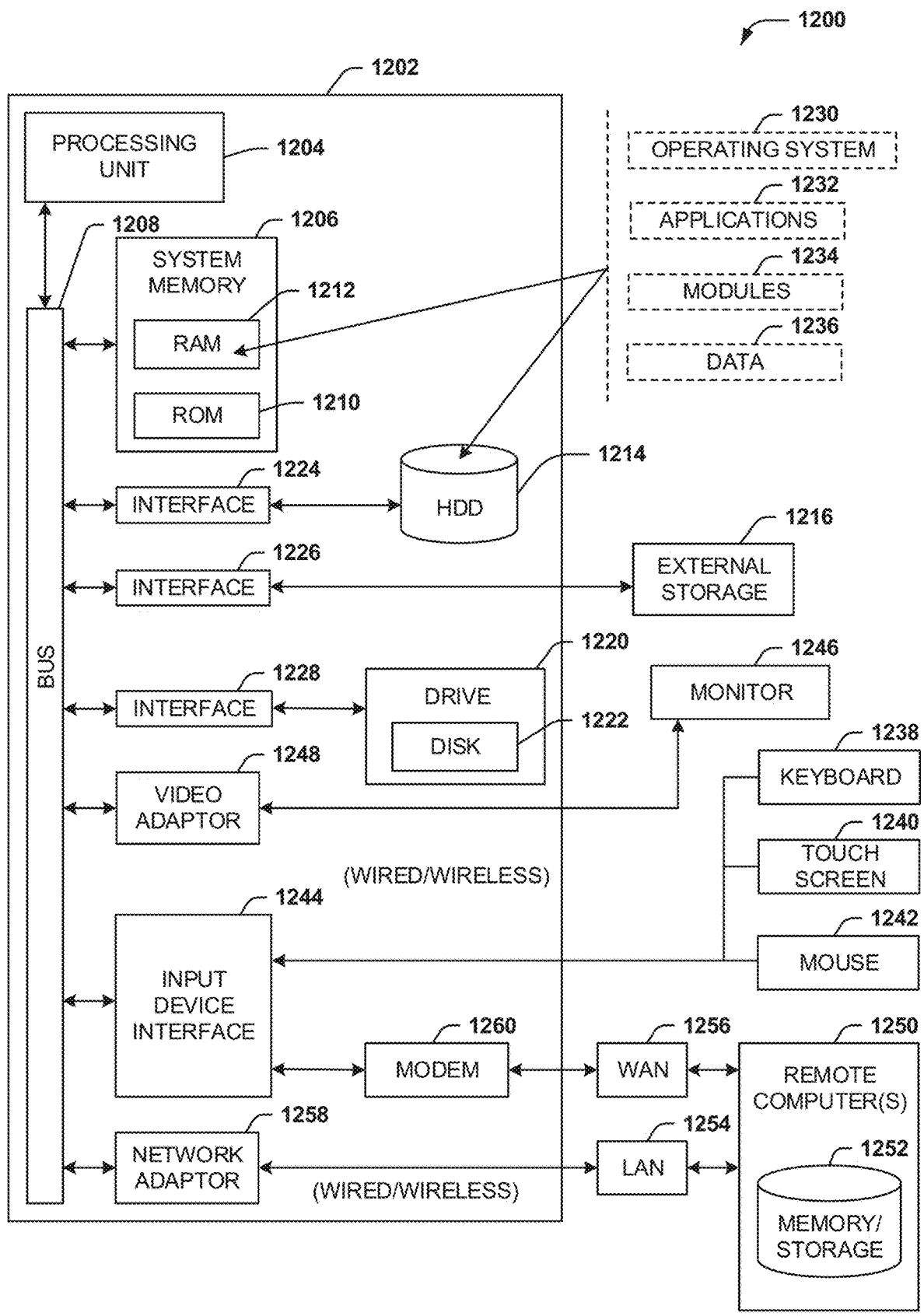
FIG. 12 illustrates a block diagram of an example, non-limiting operating environment in which one or more embodiments described herein can be implemented that can facilitate transformation of applications from a first computing environment to a target computing environment.

In order to provide additional context for various embodiments described herein, FIG. 12 and the following discussion are intended to provide a general description of a suitable computing environment 1200 in which the various embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments described herein can be also practiced in distributed computing environments where certain tasks are performed by remote processing devices that are linked through a communications network. In a distributed computing environment, program modules can be located in local and/or remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS)

can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and a drive 1220, e.g., such as a solid state drive, an optical disk drive, which can read or write from a disk 1222, such as a CD-ROM disc, a DVD, a BD, etc. Alternatively, where a solid state drive is involved, disk 1222 would not be included, unless separate. While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and drive 1220 can be connected to the system bus 1208 by an HDD interface 1224, an external storage interface 1226 and a drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, and computer-executable instructions. In some embodiments, nonvolatile storage of data can include any type of data and/or instructions. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above, such as but not limited to a network virtual machine providing one or more aspects of storage or processing of information. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 13:
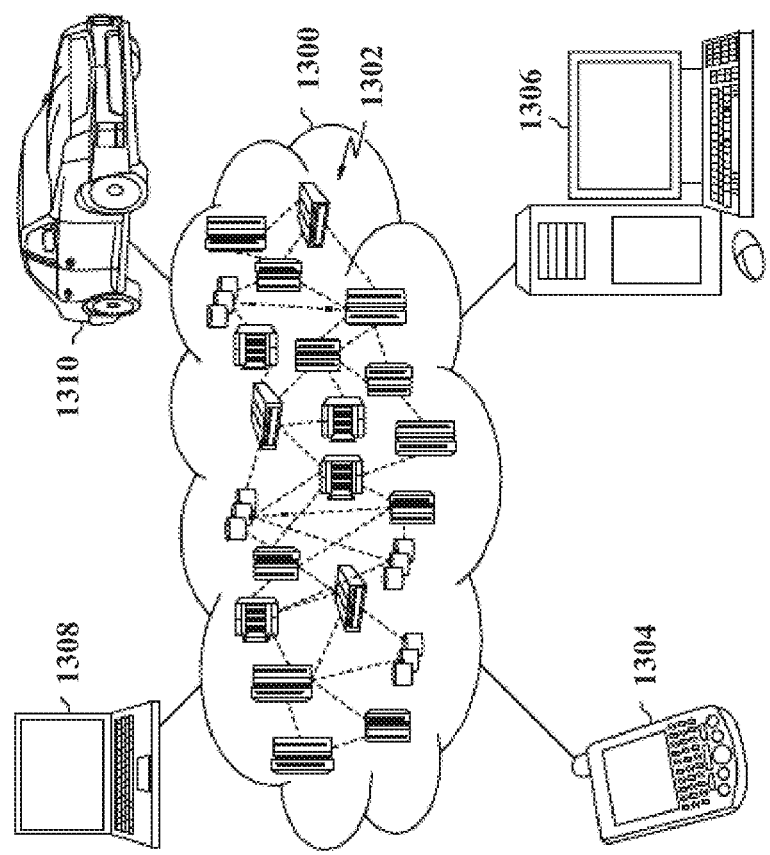
FIG. 13 illustrates an example cloud computing environment in accordance with one or more embodiments described herein that can facilitate transformation of applications from a first computing environment to a target computing environment.
Figure 14:
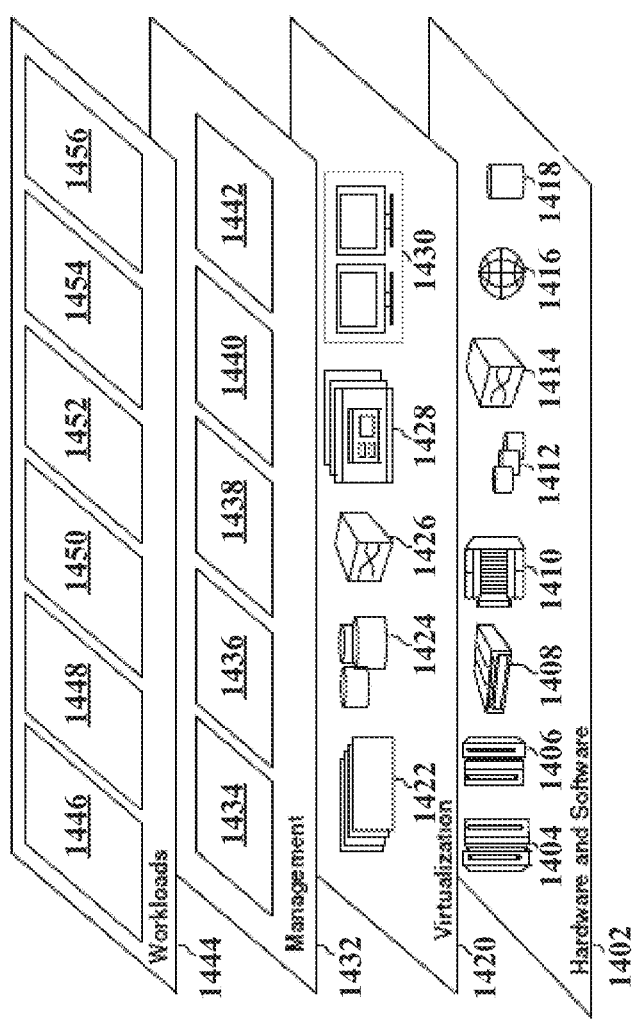
FIG. 14 illustrates example abstraction model layers provided by the cloud computing environment depicted in FIG. 13 in accordance with one or more embodiments described herein that can facilitate transformation of applications from a first computing environment to a target computing environment.

FIGS. 13 and 14 relate to example cloud-computing environments that can facilitate transformation of applications from a first computing environment to a target computing environment that can be implemented according to the example embodiments described herein. It is to be understood that although this disclosure includes a detailed description on cloud computing, implementation of the teachings recited herein are not limited to a cloud computing environment. Rather, embodiments described herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 13 illustrates an example cloud computing environment 1300 in accordance with one or more embodiments described herein that can facilitate transformation of applications from a first computing environment to a target computing environment. As shown, the cloud computing environment 1300 includes one or more cloud computing nodes 1302 with which local computing devices used by cloud consumers, such as, for example, personal digital assistant (PDA) or cellular telephone 1304, desktop computer 1306, laptop computer 1308, and/or automobile computer system 1310 may communicate. Nodes 1302 may communicate with one another. They may be grouped (not shown) physically or virtually, in one or more networks, such as Private, Community, Public, or Hybrid clouds as described hereinabove, or a combination thereof. This allows the cloud computing environment 1300 to offer infrastructure, platforms and/or software as services for which a cloud consumer does not need to maintain resources on a local computing device. It is understood that the types of computing devices 1304-1310 shown in FIG. 13 are intended to be illustrative only and that computing nodes 1302 and cloud computing environment 1300 can communicate with any type of computerized device over any type of network and/or network addressable connection (e.g., using a web browser).

FIG. 14 illustrates example abstraction model layers provided by the cloud computing environment depicted in FIG. 13 in accordance with one or more embodiments described herein that can facilitate transformation of applications from a first computing environment to a target computing environment. A set of functional abstraction layers is provided by the cloud computing environment 1300 of FIG. 13 is shown. Repetitive description of like elements employed in other embodiments described herein is omitted for sake of brevity. It should be understood in advance that the components, layers, and functions shown in FIG. 14 are intended to be illustrative only and embodiments described herein are not limited thereto. As depicted, the following layers and corresponding functions are provided.

Hardware and software layer 1402 can include hardware and software components. Examples of hardware components include: mainframes 1404; RISC (Reduced Instruction Set Computer) architecture-based servers 1406; servers 1408; blade servers 1410; storage devices 1412; and networks and networking components 1414. In some embodiments, software components include network application server software 1416 and database software 1418.

Virtualization layer 1420 can provide an abstraction layer from which the following examples of virtual entities may be provided: virtual servers 1422; virtual storage 1424; virtual networks 1426, including virtual private networks; virtual applications and operating systems 1428; and virtual clients 1430.

In one example, management layer 1432 may provide the functions described below. Resource provisioning 1434 can provide dynamic procurement of computing resources and other resources that are utilized to perform tasks within the cloud computing environment. Metering and Pricing 1436 can provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1438 can provide access to the cloud computing environment for consumers and system administrators. Service level management 1440 can provide cloud computing resource allocation and management such that required service levels are met. Service Level Agreement (SLA) planning and fulfillment 1442 can provide pre-arrangement for, and procurement of, cloud computing resources for which a future requirement is anticipated in accordance with an SLA.

Workloads layer 1444 can provide examples of functionality for which the cloud computing environment may be utilized. Examples of workloads and functions which may be provided from this layer include: mapping and navigation 1446; software development and lifecycle management 1448; virtual classroom education delivery 1450; data analytics processing 1452; transaction processing 1454; and differentially private federated learning processing 1456. Various embodiments described herein can utilize the cloud computing environment described with reference to FIGS. 13 and 14 to execute one or more differentially private federated learning processes in accordance with various embodiments described herein.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A "computer readable storage medium", as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages.

The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers.

In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
  a memory that stores computer-executable components; and
  a processor, operably coupled to the memory, that executes the computer-executable components stored in the memory, wherein the computer-executable components comprise:
    a model generator component that executes a search function on an application based on a set of application component topics to identify application components that facilitate execution of the application;
    a configuration property extractor component that analyzes the application based on the application components and determines configuration properties associated with operating the application components;
    an application builder component that processes the application components and the configuration properties and generates instructions that facilitate execution of the application in a target computing environment; and
    a first feedback interface having a first output and a first input that is rendered by a model generator component, wherein the first output displays the application components retrieved by the search function, wherein the first input receives user feedback that enables updating an instance level metamodel with application components that were not retrieved by the search function.

2. The system of claim 1, wherein the model generator component generates the instance level metamodel for the application based on the search function that describes the application components that facilitate execution of the application.

3. The system of claim 1, wherein the configuration property extractor component analyzes related files of the application components and employs a first machine learning component that learns from the related files of the application components and extracts parameters that define the configuration properties in response to the learning that enable configuration of the application components.

4. The system of claim 3, wherein the first machine learning component is an artificial intelligence classifier or a neural network that employs a bidirectional long short-term memory (BI-LSTM) network that performs the learning.

5. The system of claim 3, further comprising a component configuration file that stores the application components and the configuration properties, wherein the model generator component stores the application components retrieved by the search function and the configuration property extractor component stores the configuration properties and associated parameters learned from analyzing the related files of the application components.

6. The system of claim 5, further comprising a second feedback interface having a second output and a second input that is rendered by the model generator component, wherein the second output displays the configuration properties and associated parameters in the component configuration file, wherein the second input receives user feedback that enables updating the component configuration file with configuration properties and associated parameters that were not determined by the configuration property extractor component.

7. The system of claim 5, wherein the application builder component stores templates that describe target computing operations of the application components stored in the component configuration file, wherein the application builder component updates the templates with the configuration properties and associated parameters for the respective application components in the component configuration file and generates the target computing environment instructions based on the updates.

8. The system of claim 7, wherein application builder component generates output images from the updated templates representing the target computing environment instructions, the output images instruct the target computing system to execute the application and associated application components in a cloud computing environment.

9. The system of claim 8, further comprising a reinforcement learning component that employs a second machine learning component that learns from execution of the application and associated application components in the target computing environment, wherein the reinforcement learning component updates the component configuration file based on the learning that facilitates discovery of uncovered, erroneous, or missing dependencies between application components and associated configuration properties or parameters.

10. The system of claim 1, further comprising a topic learning component that employs a third machine learning component that learns from words or phrases within input images that describe execution of a plurality of deployed target computing applications, wherein the topic learning component generates a target metamodel that stores the set of application component topics based on the learning.

11. The system of claim 10, wherein the application component topics describe computing resources available to the application in the target computing environment, the computing resources include at least one of a database, operating system, or server.

12. The system of claim 10, wherein the third machine learning component is an artificial intelligence classifier or a neural network that employs a Latent Dirichlet Allocation (LDA) component that identifies the set of application component topics from the words or phrases within input images, wherein the input images include instructions to execute the deployed applications in a cloud computing environment.

13. The system of claim 10, wherein the search function is executed by a search engine that retrieves the application components from the application based on searching with words associated with the application component topics, wherein the search engine is a crawler search engine or an elastic search engine.

14. A computer-implemented method, comprising:
receiving, by a system operatively coupled to a processor, a set of application component topics that specify resources of a target computing environment;
searching an application, by the system, based on the application component topics to identify application components of the application that facilitate execution of the application;
determining, by the system, configuration properties associated with operating the application components;
generating, by the system, instructions that facilitate execution of the application in the target computing environment based on processing the application components and the configuration properties;
learning, by the system, the set of application component topics from words or phrases within input images that describe execution of a plurality of deployed target computing applications; and
generating, by the system, a target metamodel that stores the set of application component topics based on the learning.

15. The computer-implemented method of claim 14, further comprising generating, by the system, an instance level metamodel for the application based on the search function that describes the application components that facilitate execution of the application.

16. The computer-implemented method of claim 14, further comprising updating, by the system, templates that describe operations of the application components and determined configuration properties in the target computing environment.

17. A computer program product that facilitates migration to a target computing environment, the computer program product comprising a computer readable memory having program instructions embodied therewith, the program instructions executable by a processor to cause the processor to:
receive, by the processor, a set of application component topics that specify resources of a target computing environment;

search an application, by the processor, based on the application component topics to identify application components of the application that facilitate execution of the application;

determine, by the processor, configuration properties associated with operating the application components;

generate, by the processor, instructions that facilitate execution of the application in the target computing environment based on processing the application components and the configuration properties;

generate, by the processor, an instance level metamodel for the application based on the search function that describes the application components that facilitate execution of the application; and learn, by the processor, the set of application component topics from words or phrases within input images that describe execution of a plurality of deployed target computing applications.

* * * * *